(12) United States Patent
Mo et al.

(10) Patent No.: US 9,113,411 B2
(45) Date of Patent: Aug. 18, 2015

(54) ADAPTIVE TRANSCEIVER FOR UTILIZING WHITE SPACE SPECTRUM IN MOBILE APPLICATION

(75) Inventors: Shih Hsiung Mo, San Jose, CA (US); Hans Wang, Mountain View, CA (US); Binglei Zhang, San Jose, CA (US); Tao Li, Campbell, CA (US)

(73) Assignee: AVIACOMM INC., Santa Clara, CA (US)

( * ) Notice: Subject to any disclaimer, the term of this patent is extended or adjusted under 35 U.S.C. 154(b) by 81 days.

(21) Appl. No.: 13/325,373

(22) Filed: Dec. 14, 2011

(65) Prior Publication Data

US 2013/0157590 A1    Jun. 20, 2013

(51) Int. Cl.
*H04B 1/40*    (2006.01)
*H04B 1/50*    (2006.01)
*H04W 52/02*    (2009.01)

(52) U.S. Cl.
CPC ............. *H04W 52/0209* (2013.01); *H04B 1/40* (2013.01)

(58) Field of Classification Search
CPC ............... H04B 1/40; H04B 52/0209
USPC ............................................................ 455/77
See application file for complete search history.

(56) References Cited

U.S. PATENT DOCUMENTS

| | | | |
|---|---|---|---|
| 5,020,093 A | * | 5/1991 | Pireh ........................... 455/552.1 |
| 2003/0163831 A1 | * | 8/2003 | Gall et al. ...................... 725/127 |
| 2008/0176523 A1 | * | 7/2008 | Sutton et al. ..................... 455/76 |
| 2009/0130999 A1 | * | 5/2009 | Chen et al. ...................... 455/129 |
| 2010/0178900 A1 | * | 7/2010 | Cheng et al. ................. 455/414.1 |
| 2012/0108224 A1 | * | 5/2012 | Cheng et al. ................... 455/418 |
| 2012/0176998 A1 | * | 7/2012 | Muellner et al. ............... 370/329 |
| 2012/0231825 A1 | * | 9/2012 | Gossain et al. ................ 455/509 |

FOREIGN PATENT DOCUMENTS

WO    WO 2011/035807    *    3/2011    ............ H04W 52/34

* cited by examiner

*Primary Examiner* — Wesley Kim
*Assistant Examiner* — Devan Sandiford
(74) *Attorney, Agent, or Firm* — Shun Yao; Park, Vaughan, Fleming & Dowler LLP

(57) ABSTRACT

One embodiment of the present invention provides a transceiver for a wireless mobile device. The transceiver includes a transmitter, a receiver, and a bandwidth-determination mechanism configured to determine a transmission bandwidth for the transmitter and a receiving bandwidth for the receiver.

10 Claims, 3 Drawing Sheets

ADAPTIVE TRANSCEIVER FOR UTILIZING WHITE SPACE SPECTRUM IN MOBILE APPLICATION

BACKGROUND

1. Field

The present disclosure relates generally to a wireless transceiver. More specifically, the present disclosure relates to an asymmetrical wireless transceiver that enables the utilization of the TV white space spectrum.

2. Related Art

A recent decision of the Federal Communications Commission (FCC) has allowed unlicensed broadcasting devices access to "white spaces" in the television spectrum, prompting the development of the "WhiteFi" technology and white-spaces devices. Unlike traditional WiFi, which operates most commonly at 2.4 GHz and 5.0 GHz, white-spaces devices operate over 30 separate 6 MHz TV channels (freed after the conversion to digital TV) in the ultra-high frequency (UHF) band.

In order to protect licensed TV broadcasters from harmful interference, the FCC has required that the level of interference from adjacent channels needs to be at least 55 dB below the highest average power in the channel. This requirement limits the amount of distortion or nonlinearity that can be tolerated by the power amplifier (PA), because an amplifier that compresses its input or has a nonlinear input/output relationship causes the output signal to splatter onto adjacent frequencies. As a result, the required amount of backed-off power from the P1dB compression point can be significantly large, thus resulting in a relatively low PA efficiency. For example, to meet the requirement of the FCC spectral mask, the PA needs to have a P1dB point of approximately 35 dBm (with 18 dB back-off margin). This can lead to rapid battery drainage of mobile devices.

SUMMARY

One embodiment of the present invention provides a transceiver for a wireless mobile device. The transceiver includes a transmitter, a receiver, and a bandwidth-determination mechanism configured to determine a transmission bandwidth for the transmitter and a receiving bandwidth for the receiver.

In a variation on this embodiment, the bandwidth-determination mechanism determines the transmission bandwidth and the receiving bandwidth based on a power budget of the mobile device.

In a variation on this embodiment, the transmission bandwidth is smaller than the receiving bandwidth.

In a variation on this embodiment, the transmitter includes a tunable modulator.

In a further variation, the tunable modulator has a tuning range between 300 MHz and 3.6 GHz.

In a variation on this embodiment, the transmitter is configured to operate on a TV channel.

In a further embodiment, the receiving bandwidth is substantially the same as the TV channel's bandwidth, and the transmission bandwidth is substantially smaller than the TV channel's bandwidth.

In a variation on this embodiment, the receiver includes multiple receiving modules, each configured to receive RF signals at a different bandwidth.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Overview

Embodiments of the present invention provide a novel physical layer protocol for wireless mobile application. This protocol enables effective power usage of mobile devices by allowing mobile devices to have an adaptive bandwidth. In one embodiment, a mobile device transmits at a bandwidth that is lower than the one used for receiving.

Adaptive Transceiver

Although the FCC has opened up the TV white space spectrum for wireless mobile applications, a number of hurdles remain for consumer mobile devices to use these white spaces. More specifically, the stringent spectrum mask requirement has limited the amount of nonlinearity that can be tolerated. In order to fully utilize the channel bandwidth while meeting the linearity requirement, the transmitter of the wireless device needs to be equipped with a very linear PA. Although conventional class-A PAs can produce a relatively linear output, their efficacy tends to be low, typically at 25% or lower. In addition, the required P1dB back-off margin of 18 dB (as required by the FCC spectrum mask) further reduces the power efficiency to $1/64$ (1.6%). In other words, to produce 16 mW of output power, the PA needs to consume 1 W of power. Power-constrained mobile devices with such a low efficiency cannot be commercialized.

Figure 1B:
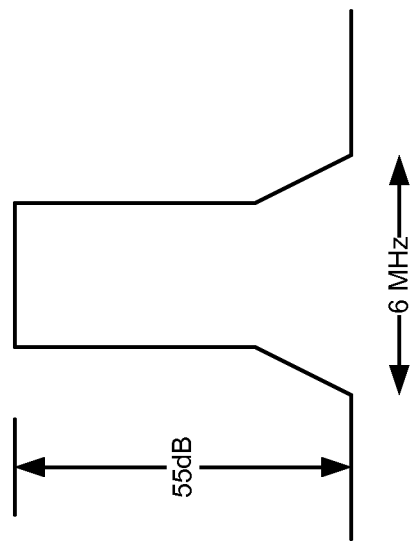
FIG. 1B presents a diagram illustrating an exemplary transmission spectrum meeting the requirement of the FCC spectrum mask.
Figure 1A:
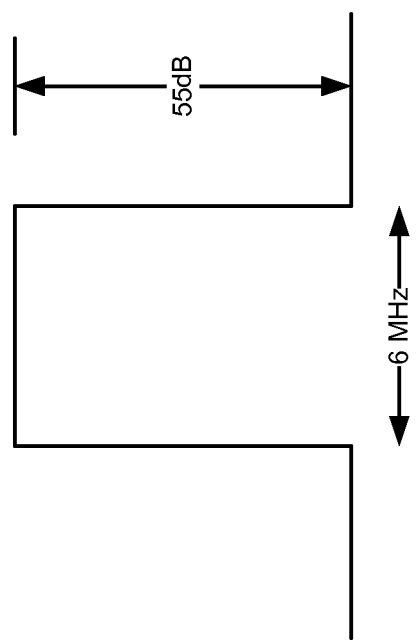
FIG. 1A presents a diagram illustrating the spectrum mask required by the FCC for mobile devices transmitting in the TV white spaces.

To reduce the power consumed by the PA, one approach is to reduce the channel bandwidth, which can lead to a relaxed spectrum mask, and thus a relaxation of the linearity requirement. FIG. 1A presents a diagram illustrating the spectrum mask required by the FCC for mobile devices transmitting in the TV white spaces. FIG. 1B presents a diagram illustrating an exemplary transmission spectrum meeting the requirement of the FCC spectrum mask. As one can see in FIG. 1B, if the transmission bandwidth is reduced, the allowed level of interference from adjacent channels can be increased, which means the linearity requirement for the PA can be relaxed. As discussed earlier, the relaxed linearity requirement means mobile devices can adopt PAs having a lower P1dB point and higher power efficiency.

Figure 2:
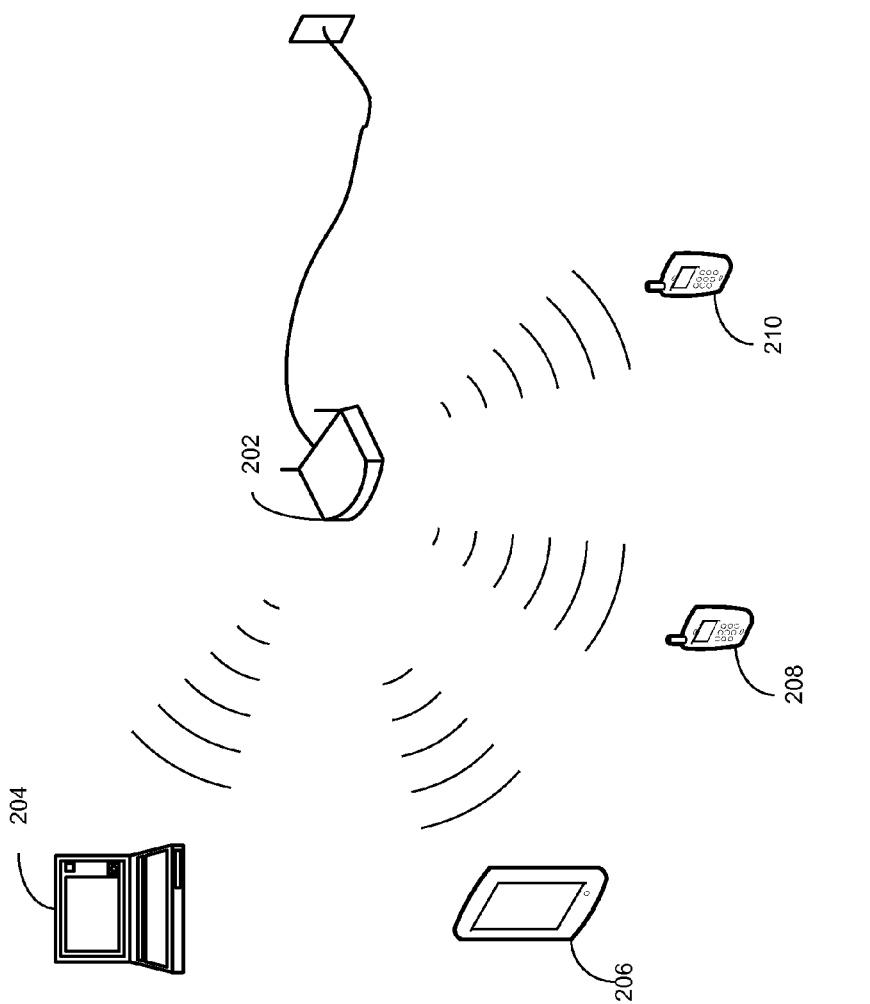
FIG. 2 presents a diagram illustrating the architecture of an exemplary wireless local access network (LAN).

FIG. 2 presents a diagram illustrating the architecture of an exemplary wireless local access network (LAN). Wireless LAN 200 includes an access point 202 and a number of mobile devices, such as a laptop computer 204, a tablet computer 206, and smartphones 208 and 210.

Note that, from the point of view of mobile devices 204-210, the transmission (uploading) data rate is often smaller than the receiving (downloading) data rate. In addition, access point 202 is a fixed location device and, thus, does not suffer from the same power constraint problems of the mobile devices 204-210. Therefore access point 202 can transmit data using the entire TV channel bandwidth (6 MHz) while meeting the FCC spectrum mask requirement. On the other hand, the asymmetrical nature of data communication makes it possible to allow mobile devices 204-210 to transmit data using only a portion of the TV channel bandwidth, such as 2 MHz.

Conventional wireless networks usually have symmetrical links, meaning that the transmission and receiving bandwidths are same. To fully utilize the TV channel bandwidth while meeting the power constraints of mobile devices, embodiments of the present invention implement a novel physical layer (PHY) protocol and an adaptive transceiver algorithm for the media access control (MAC) layer to allow the mobile device to receive at the full channel bandwidth while transmitting at a lower bandwidth. More specifically, under this new PHY protocol, mobile devices 204-210 receive from access point 202 using a larger bandwidth (such as the full TV channel bandwidth of 6 MHz or a bandwidth of 5 MHz) and transmit to access point 202 at a smaller bandwidth (such as 2 MHz). In addition, when mobile devices are communicating among each other (e.g., smartphone 208 may download files from laptop computer 204), due to the power constraints of laptop computer 204, smartphone 208 will receive at a reduced bandwidth. In other words, the receiver of smartphone 208 is able to handle different bandwidths.

Figure 3:
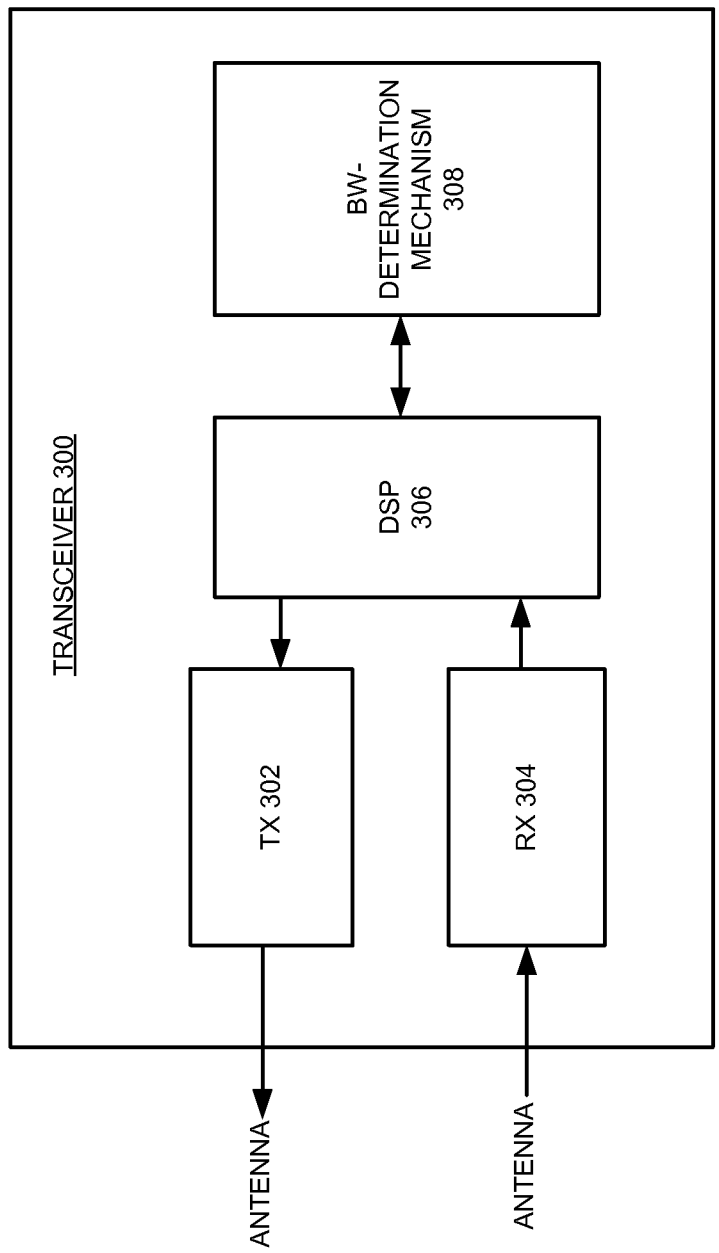
FIG. 3 presents a diagram illustrating the architecture of a mobile device transceiver, in accordance with an embodiment of the present invention.

FIG. 3 presents a diagram illustrating the architecture of a mobile device transceiver, in accordance with an embodiment of the present invention. In FIG. 3, transceiver 300 includes a transmitter 302, a dual-bandwidth receiver 304, a baseband digital signal processor (DSP) 306, and a bandwidth-determination mechanism 308. During operation, bandwidth-determination mechanism 308 determines an optimal downlink-to-uplink bandwidth ratio based on the power budget of the mobile device and the available channel bandwidth. For example, for white-spaces devices, the available channel bandwidth is 6 MHz; if the device is power constrained (such as a laptop computer on battery power), bandwidth-determination mechanism 308 determines that the transmission (uplink) bandwidth should be much smaller than the receiving bandwidth (such as 2 MHz TX bandwidth vs. 5 MHz RX bandwidth).

This adaptive algorithm is implemented by baseband DSP 306, which controls the bandwidths of transmitter 302 and receiver 304. In one embodiment, if bandwidth-determination mechanism 308 determines that the transmission bandwidth should be reduced based on the current power budget, DSP 306 generates a baseband signal at the reduced bandwidth before sending it to transmitter 302 for transmission. Transmitter 302 can include any type of transmitter circuits capable of modulating and amplifying a baseband RF signal. In one embodiment, transmitter 302 includes a tunable modulator capable of modulating the baseband RF signal to various carrier frequencies. In a further embodiment, the tuning range of the tunable modulator covers the entire wireless communication spectrum (from 300 MHz to 3.6 GHz). In one embodiment, the tunable modulator is a quadrature modulator.

Dual-bandwidth receiver 304 is configured to receive data of at least two different bandwidths. In one embodiment, dual-bandwidth receiver 304 includes two receiving modules, each optimized for a particular bandwidth. If the received RF signal is from an access point, meaning it has a larger bandwidth, dual-bandwidth receiver 304 receives the RF signal using its receiving module optimized to the larger bandwidth. The received signal is demodulated and sent to DSP 306 for processing. On the other hand, if the received RF signal is from another mobile device, meaning it has a smaller bandwidth, dual-bandwidth receiver 304 receives the RF signal using its receiving module optimized to the smaller bandwidth and sends the demodulated signal to DSP 306 for processing. In one embodiment, dual-bandwidth receiver 304 includes a tunable demodulator capable of demodulating received RF signals having various carrier frequencies. In a further embodiment, the tuning range of the tunable demodulator covers the entire wireless communication spectrum (from 300 MHz to 3.6 GHz). In one embodiment, the tunable demodulator is a quadrature demodulator.

The schematic shown in FIG. 3 is for illustration purposes only and should not limit the scope of this disclosure. In general, embodiments of the present invention provide a wireless transceiver configured to transmit and receive at different bandwidths. More specifically, the transceiver adjusts its TX bandwidth based on the power budget and the available channel bandwidth.

The foregoing descriptions of embodiments of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A transceiver for a wireless mobile device, comprising:
a transmitter configured to transmit over a transmission band occupying a first portion of a first white space TV channel, wherein the first portion of the first white space TV channel has a narrower bandwidth than a standard TV channel to enable the transceiver to satisfy a predetermined spectrum mask requirement;
a receiver configured to receive over a receiving band occupying a second portion of a second white space TV channel; and
a bandwidth-determination mechanism configured to determine an optimal downlink-to-uplink bandwidth ratio based on a current power budget of the mobile device to satisfy the predetermined spectrum mask requirement under the current power budget, wherein the downlink-to-uplink bandwidth ratio indicates a ratio of the second portion of the second white space TV channel to the first portion of the first white space TV channel, and wherein while determining the optimal downlink-to-uplink bandwidth ratio, the bandwidth-determination mechanism is further configured to:
determine whether the wireless mobile device is on battery power; and
in response to determining that the mobile device is on battery power, reduce the first portion of the first white space TV channel to a smaller portion.

2. The transceiver of claim 1, wherein the transmitter includes a tunable modulator.

3. The transceiver of claim 2, wherein the tunable modulator has a tuning range that ranges from 300 MHz up to 3.6 GHz.

4. The transceiver of claim 1, wherein the determined optimal downlink-to-uplink bandwidth ratio is greater than 1.

5. The transceiver of claim 1, wherein the receiver includes multiple receiving modules, each configured to receive RF signals at a different bandwidth.

6. A method for generating a transmitter output for a wireless mobile device, comprising:
- determining a power budget of the mobile device, which involves determining whether the wireless mobile device is on battery power;
- determining an optimal downlink-to-uplink bandwidth ratio based on the power budget, wherein the downlink-to-uplink bandwidth ratio indicates a bandwidth ratio of a receiving band to a transmission band, wherein the transmitting band occupies a first portion of a first white space TV channel, the receiving band occupies a second portion of the second white space TV channel, and wherein the first portion of the first white space TV channel has a narrower bandwidth than a standard TV channel to enable the transceiver to meet a predetermined spectrum mask requirement;
- generating the transmitter output based on the determined optimal downlink-to-uplink bandwidth ratio, thereby enabling the transceiver to meet the predetermined spectrum mask requirement under the current power budget; and
- in response to determining that the wireless mobile device is on battery power, reducing the first portion of the first white space TV channel to a smaller portion.

7. The method of claim 6, wherein generating the transmitter output further involves:
- generating a baseband signal; and
- modulating the baseband signal.

8. The method of claim 7, wherein modulating the baseband signal is performed by a tunable modulator.

9. The method of claim 8, wherein the tunable modulator has a tuning range that ranges from 300 MHz up to 3.6 GHz.

10. The method of claim 6, wherein the determined optimal downlink-to-uplink bandwidth ratio is greater than 1.

* * * * *